United States Patent
Lueck

(10) Patent No.: US 10,655,493 B2
(45) Date of Patent: May 19, 2020

(54) ARRANGEMENT, TURBO ENGINE AND METHOD FOR THE RECOGNITION OF A SHAFT BREAKAGE OF A SHAFT

(71) Applicant: Rolls-Royce Deutschland Ltd & Co KG, Blankenfelde-Mahlow (DE)

(72) Inventor: Rudolf Lueck, Nuthetal-Rehbruecke (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 118 days.

(21) Appl. No.: 16/015,747

(22) Filed: Jun. 22, 2018

(65) Prior Publication Data
US 2019/0032511 A1    Jan. 31, 2019

(30) Foreign Application Priority Data
Jul. 28, 2017    (DE) .................. 10 2017 213 094

(51) Int. Cl.
*F01D 21/04* (2006.01)
*F01D 21/00* (2006.01)
(Continued)

(52) U.S. Cl.
CPC ......... *F01D 21/045* (2013.01); *F01D 21/003* (2013.01); *F01D 21/06* (2013.01);
(Continued)

(58) Field of Classification Search
CPC ........ F01D 21/003; F01D 21/06; F01D 21/02; F01D 21/045; G01R 31/026; G01M 13/02;
(Continued)

(56) References Cited

U.S. PATENT DOCUMENTS

| | | | |
|---|---|---|---|
| 4,473,998 A | 10/1984 | King | |
| 7,002,172 B2 | 2/2006 | Rensch | |

(Continued)

FOREIGN PATENT DOCUMENTS

| | | |
|---|---|---|
| DE | 3322430 A1 | 1/1984 |
| DE | 3211103 A1 | 11/1985 |

(Continued)

OTHER PUBLICATIONS

German Search Report dated May 16, 2018 for counterpart German Patent Application No. 10 2017 213 094.6.

(Continued)

*Primary Examiner* — Igor Kershteyn
(74) *Attorney, Agent, or Firm* — Shuttleworth & Ingersoll, PLC; Timothy J. Klima

(57) ABSTRACT

An arrangement for detecting a shaft break, including a shaft and a reference shaft that can be rotated together with the shaft, wherein an opening in the shaft overlaps with an opening in the reference shaft in an operational state of the shaft according to the intended use, and a signal conductor that can be severed extends through the two openings and is operatively connected to an evaluation unit, and the evaluation unit is configured to detect a severing of the signal conductor by applying a signal to the signal conductor to detect a shaft break of the shaft. The invention further relates to a turbomachine and a method.

19 Claims, 8 Drawing Sheets

(51) Int. Cl.
*F01D 21/06* (2006.01)
*G01R 31/02* (2006.01)
*G01B 7/31* (2006.01)
*G01M 15/14* (2006.01)
*G01M 13/02* (2019.01)
*F01D 21/02* (2006.01)

(52) U.S. Cl.
CPC .............. *G01B 7/31* (2013.01); *G01M 13/02* (2013.01); *G01M 15/14* (2013.01); *G01R 31/026* (2013.01); *F01D 21/02* (2013.01); *F05D 2240/61* (2013.01); *F05D 2260/80* (2013.01); *F05D 2260/83* (2013.01); *F05D 2270/09* (2013.01); *F05D 2270/80* (2013.01)

(58) Field of Classification Search
CPC ...... G01M 15/14; G01B 7/31; F05D 2240/61; F05D 2260/80; F05D 2260/83; F05D 2270/09; F05D 2270/80
See application file for complete search history.

(56) References Cited

U.S. PATENT DOCUMENTS

| | | | |
|---|---|---|---|
| 7,735,310 B2 | 6/2010 | Metscher | |
| 2005/0047913 A1* | 3/2005 | Rensch | F01D 21/04 416/31 |
| 2008/0178573 A1* | 7/2008 | Metscher | F01D 21/003 60/39.091 |
| 2014/0241860 A1 | 8/2014 | Burghardt | |
| 2014/0290271 A1* | 10/2014 | Dalton | F02C 7/32 60/801 |
| 2018/0073387 A1 | 3/2018 | Kestering | |

FOREIGN PATENT DOCUMENTS

| | | |
|---|---|---|
| DE | 102004047892 A1 | 4/2006 |
| DE | 102009054408 A1 | 6/2011 |
| DE | 102013101791 A1 | 8/2014 |
| EP | 1457643 A2 | 9/2004 |
| EP | 2784290 A2 | 10/2014 |
| EP | 3296748 A2 | 3/2018 |
| GB | 2123568 A | 2/1984 |
| GB | 2130340 A | 5/1984 |
| GB | 2468686 A | 9/2010 |

OTHER PUBLICATIONS

European Search Report dated Dec. 4, 2018 from counterpart EP App No. 18181524.2.

* cited by examiner

ARRANGEMENT, TURBO ENGINE AND METHOD FOR THE RECOGNITION OF A SHAFT BREAKAGE OF A SHAFT

REFERENCE TO RELATED APPLICATION

This application claims priority to German Patent Application DE102017213094.6 filed Jul. 28, 2017, the entirety of which is incorporated by reference herein.

DESCRIPTION

The invention relates to an arrangement for detecting a shaft break, a turbomachine and a method for detecting a shaft break of a shaft as disclosed herein.

In the event of unusually high loads acting on a shaft, a breakage of the shaft may occur. A shaft break can result in consequential damage, which may be minimized or avoided through the timely initiation of countermeasures. In order to be able to take countermeasures within as short a time as possible, it is necessary to detect the breakage of the shaft quickly and reliably. For example, a fuel supply of the turbomachine can be cut as a countermeasure if the arrangement is part of a turbomachine.

In a mechanical system for taking countermeasures following a shaft break in a turbomachine that is known to the applicant from practice, a combination of the shaft with a coaxial reference shaft rotating together with the shaft is used. Recesses are provided in the shaft and the reference shaft, which are out of alignment with each other in the normal operational state of the shaft. When the shaft breaks, the recesses come into alignment with each other, and a hook or bar is passed through the recesses. This movement of the bar interrupts the fuel supply.

However, such mechanical solutions have a high weight and a complex structure.

There is the objective of providing an improved arrangement and an improved method for detecting a shaft break, which is in particular characterized by a particularly simple structure.

The objective is achieved by an arrangement with the features as disclosed herein.

Accordingly, such an arrangement for detecting a shaft break has at least one shaft that transmits a torque between a drive side and an output side and that is mounted in a rotatable manner (for example at least at one bearing), as well as a reference shaft that can be rotated (in particular with respect to the bearing) together with the shaft and that does not transmit any torque or transmits less torque as compared to the shaft. Here, at least one opening is provided in the shaft, which overlaps with an opening in the reference shaft during normal operation of the shaft, wherein a signal conductor (for conducting signals) which can be severed is arranged so as to extend through the pair of overlapping openings of the shaft and the reference shaft and the signal conductor is operatively connected to an evaluation unit of the arrangement. The evaluation unit is configured to detect if the signal conductor has been severed by applying at least one signal to the signal conductor to thereby detect a shaft break of the shaft. In other words, the evaluation unit can detect whether or not a signal conductor is severed by applying the signal or signals to the signal conductor, e.g. by the evaluation unit determining whether or not the signal conductor is conducting the signal.

Thanks to an arrangement that is improved in such a manner, many movable mechanical parts can be foregone, such as for example a bar that reaches into recesses. In this manner, a simpler structure of the arrangement becomes possible.

After a shaft break has been detected, suitable countermeasures can be initiated through the arrangement, e.g. a fuel supply can be blocked. The described arrangement makes it possible to take the countermeasures with a particularly small time delay, which facilitates a high effectivity of the measures.

For increased precision in detecting the shaft break, multiple pairs of overlapping openings (arranged so as to be at least partially or at least mostly superimposed upon each other) can be provided in the shaft and the reference shaft, with respectively one signal conductor being inserted therein. Alternatively or additionally, multiple signal conductors are arranged in the same pair of overlapping openings.

An opening may e.g. be a hole through a wall of the shaft or the reference shaft.

In an overloaded operational state of the shaft that does not correspond to the intended use, the at least one pair of openings in the shaft and the reference shaft overlapping in the operational state of the shaft either overlaps less or does not overlap at all. This is due to the fact that a shaft break of the shaft causes a relative movement of the shaft with respect to reference shaft.

The signal conductor is dimensioned and configured in such a manner that a relative movement of the shaft with respect to reference shaft (in particular in the form of a rotation) can sever the signal conductor, e.g. by a [shearing effect] of the edges of the openings. In this manner, a reliable detection of the shaft break is facilitated.

The signal conductor may for example be embedded in a breakage element that can in particular comprise or consist of a brittle material. In this manner, a fragile signal conductor can be used and held securely inside the openings. The breakage element is preferably embodied in such a manner that a breakage of the breakage element (resulting from the shaft break) severs the signal conductor embedded therein, and in particular facilitates a severing. In this manner, also flexible signal conductors can be used, which would possibly only be bent but not severed without a breakage element. The breakage element can be configured as shear pin, for example.

According to a further development, the brittle material consists of a ceramic material or comprises a ceramic material. For example, the breakage element can be embodied as a ceramic material pin or bolt. Ceramic material is particularly heat-resistant and can thus also be used in areas with higher temperatures. In addition, ceramic material is brittle and breaks at a certain load.

The breakage element can have one or multiple predetermined breaking point(s). In this manner, a particularly easily controllable breakage of the breakage element is possible. The at least one predetermined breaking point can be arranged or formed at the breakage element in such a manner that the signal conductor embedded in the breakage element is severed in the event of or due to a breakage of the breakage element at the predetermined breaking point.

The signal conductor can be an electrical conductor, for example. Concretely, the signal conductor can be a metal wire, e.g. a copper wire. The evaluation unit can apply an electrical signal to the signal conductor. In this manner, a particularly simple and reliable structure of the arrangement is possible. If the signal conductor conducts the electric current, the evaluation unit can determine that it is not severed. If the signal conductor does not conduct any electric current, the evaluation unit can determine that it is severed and thus detect a severing. The signal can be an alternating voltage, for example.

The signal conductor can be operatively connected to the evaluation unit by means of an inductive coupling and/or a capacitive coupling. In particular, the evaluation unit can thus be arranged in such a manner that the shaft and the reference shaft are rotatable with respect to the evaluation unit. At the same time, an inductive and/or capacitive coupling can be realized in a substantially wear-free manner.

The signal conductor can be operatively connected, in particular electrically contacted, to a non-contact signal transmission element. The non-contact signal transmission element may for example be attached to the shaft. The non-contact signal transmission element can receive signals from the evaluation unit and/or send signals to the evaluation unit. It can be activated by the evaluation unit, so that a signal is conducted through the signal conductor.

In one embodiment, the non-contact signal transmission element is configured in the form of a coil. The coil can extend (e.g. at least in certain sections) in the circumferential direction about the shaft. In particular, the coil can be wound around the shaft. The signal conductor can be coupled inductively to the evaluation unit via the coil, and can thus be operatively connected therewith.

Alternatively or additionally, the arrangement comprises a capacitor with two electrodes, e.g. capacitor plates, wherein one of the electrodes forms the non-contact signal transmission element and is affixed to the shaft. During rotation of the shaft, the electrode can be rotated with respect to the other of the two electrodes. By means of the capacitor, the signal conductor can be capacitively coupled and thus operatively connected to the evaluation unit.

The opening in the shaft and/or the opening in the reference shaft can respectively be embodied in the form of a slit. The breakage element can be embodied in such a manner that it does not completely fill out the slit at least in the length of the slit. In this manner, a tolerance can be provided, so that (minor) relative movements of the shaft with respect to the reference shaft, which are still part of the normal operational state of the shaft according to the intended use, do not yet result in the breakage element breaking.

In one embodiment, the opening of the reference shaft is larger than the opening in the shaft (overlapping with the former), for example having a larger clear width and/or a larger opening cross-sectional surface than the opening in the shaft, in particular so as to provide a compensation of a nominal torsion of the shaft (with respect to the reference shaft).

The shaft can have multiple openings that overlap with respectively one opening in the reference shaft. Here, a plurality of pairs of openings can be arranged in the shaft and the reference shaft. Preferably, multiple signal conductors that can be severed and that are operatively connected to the evaluation unit are provided, wherein each of the signal conductors that can be severed extends through a pair of overlapping openings (in particular while being embedded in respectively one breakage element).

The multiple signal conductors extending though the openings can be connected in series. In this manner, increased reliability in detecting a shaft break is achieved.

According to one embodiment of the arrangement, the shaft and the reference shaft are connected to each other in a torque-proof manner by means of a breakage protection. The breakage protection is configured in such a manner that it breaks in the event of a maximum force and/or a maximum relative displacement of the shaft with respect to the reference shaft being exceeded. As long as the breakage protection is not broken, it connects the shaft to the reference shaft and prevents such a relative displacement of the shaft and the reference shaft with respect to each other, which would lead to a breakage of the breakage element. For example, the breakage protection connects the shaft and the reference shaft to each other in a torque-proof manner. If the breakage protection is broken, it does no longer connect the shaft and the reference shaft with each other in a torque-proof manner. During normal operation, the breakage protection can couple tolerable distortions of the shaft not yet leading to a shaft break to the reference shaft, so that the signal conductor is not severed in such cases. The breakage protection may for example be arranged in the area of the overlapping openings.

The shaft and the reference shaft are aligned so as to be coaxial with respect to each other, for example for the purpose of obtaining a structure of the arrangement that is as compact as possible. The reference shaft is arranged inside the shaft. Alternatively, the shaft is arranged inside the reference shaft.

An arrangement of the opening of the shaft at a lateral surface of the shaft and of the opening of the reference shaft at a lateral surface of the reference shaft can facilitate the arrangement of the signal conductor.

According to one aspect, what is provided is a turbomachine that comprises an arrangement according to any of the embodiments described herein. The turbomachine or fluid-flow machine is in particular embodied in the form of an aircraft engine. Here, a particularly simple structure is achieved thanks to the arrangement.

If the arrangement detects a shaft break, it can take suitable countermeasures, e.g. to avoid or minimize possible consequential damage, for example by blocking a fuel supply, by emptying a fuel feed via a valve by selecting the valve and/or by adjusting variable guide vanes (VSV, variable stator vanes) to a low air flow rate. As soon as a distortion of the shaft exceeds a tolerated maximum value, the signal conductor is severed. This results in the shaft break being detected particularly quickly.

The objective is achieved through a method for detecting a shaft break of a shaft with features as disclosed herein. The method comprises the following steps:

A shaft transmitting a torque between a drive side and an output side is provided, wherein the shaft is mounted at least at one bearing in a rotatable manner. The shaft comprises at least one opening.

A reference shaft that can be rotated together with the shaft with respect to the bearing is provided. Compared to the shaft, the reference shaft transfers less or no torque. The reference shaft comprises at least one opening that overlaps with the opening in the shaft in an operational state of the shaft according to the intended use. Extending through the two overlapping openings is a signal conductor that can be severed.

By applying a signal to the signal conductor it is determined whether the signal conductor is severed or not. If the signal conductor is severed, a shaft break of the shaft is detected.

It is possible to measure the severing itself (e.g. through the interruption of a current flow) and/or the detuning of an oscillation circuit (which preferably comprises the signal conductor).

In this manner it is possible to detect a shaft break of the shaft with particularly simple means and to take suitable countermeasures with a particularly short delay.

In the method, an arrangement or turbomachine according to any of the embodiments described herein may be used.

The invention is described in more detail in connection with the exemplary embodiments shown in the drawings. Herein:

Figure 1:
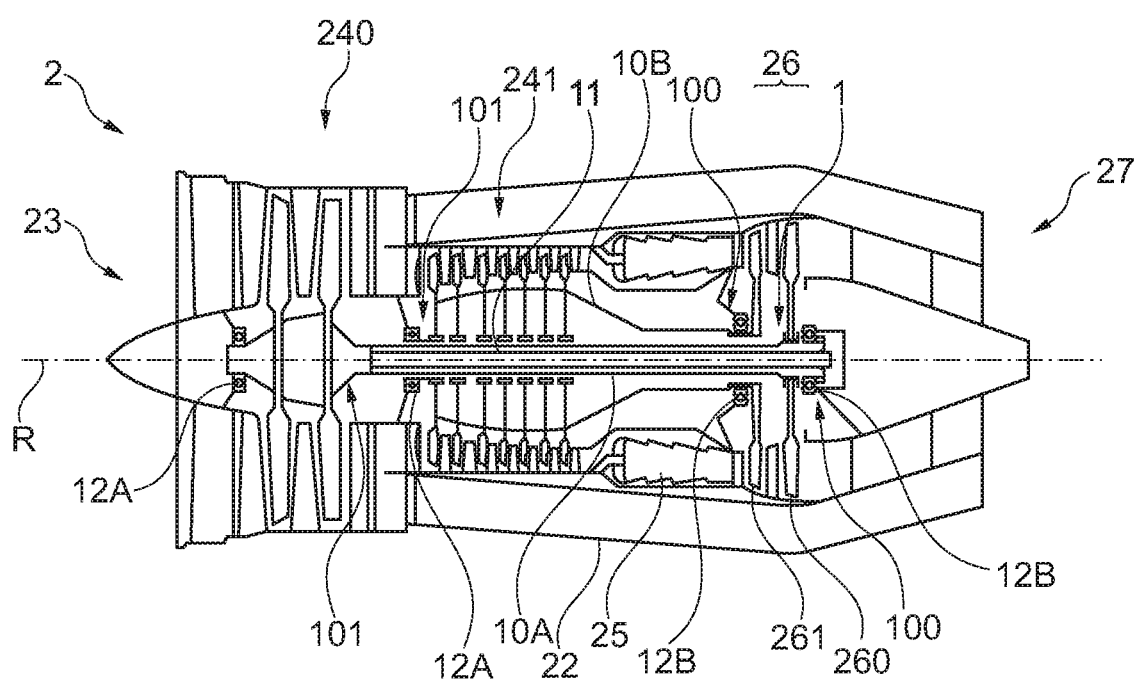
FIG. 1 Shows a schematic rendering of an aircraft engine as an embodiment of a turbomachine.

FIG. 1 shows a turbomachine in the exemplary embodiment of an aircraft turbine for an aircraft. The turbomachine 2 comprises multiple, in the present case two, shafts 10A, 10B that are rotatable about a common rotational axis R. The shafts 10A, 10B are arranged inside a housing 22 of the turbomachine 2. The housing 22 defines an air intake 23 of the turbomachine 2.

An air flow flows into the turbomachine 2 through the air intake 23. On a side of the turbomachine 2 that is located opposite the air intake 23, the turbomachine 2 has a nozzle 27. The turbomachine 2 has an axial main flow direction that extends substantially in parallel to the rotational axis R of the two shafts 10A, 10B and is oriented from the air intake 23 to the nozzle 27. After the air intake 23, as viewed substantially in the direction of the main flow direction, the turbomachine 2 comprises a fan 240, a compressor 241, a combustion chamber 25, a turbine 26, and the nozzle 27.

In the present case, the turbomachine 2 is embodied with two shafts. One of the shafts 10A, 10B serves as a low-pressure shaft 10A, the other as a high-pressure shaft 10B. Fixedly arranged at the low-pressure shaft 10A are the fan 240 and a low-pressure turbine 260 of the turbine 26. Fixedly arranged at the high-pressure shaft 10B are the compressor 241 as well as a high-pressure turbine 260 of the turbine 26.

The turbomachine 2 works in a per se known manner. The fan 240 and the compressor 241 compress the inflowing air flow, and conduct it into the combustion chamber 25 for the purpose of combustion. The tension in the hot combustion gases exiting the combustion chamber 25 is reduced in the high-pressure turbine 261 and in the low-pressure turbine 260 before discharge through the nozzle 27. The nozzle 27 ensures residual pressure release of the exiting hot combustion gases, as well as intermixing with secondary air, wherein the exiting air flow is accelerated.

The low-pressure turbine 260 drives the fan 240 via the low-pressure shaft 10A. The high-pressure turbine 261 drives the compressor 241 via the high-pressure shaft 10B.

Both shafts 10A, 10B are mounted by means of suitable bearings 12A, 12B so as to be rotatable about a rotational axis R with respect to the housing 22 of the turbomachine 2. The housing 22 can be or is fixedly attached to the aircraft.

According to FIG. 1, the low-pressure shaft 10A and the high-pressure shaft 10B have a front bearing 12A at their respective ends that are facing towards the air intake 23. The front bearings 12A are for example respectively embodied as ball bearings, in particular as tapered ball bearings. At their respective ends that are facing the air outlet 27, the low-pressure shaft 10A and the high-pressure shaft 10B have a rear bearing 12B. The rear bearings 12B are for example respectively formed as roller bearings.

The high-pressure shaft 10B is formed as a hollow shaft. The low-pressure shaft 10A is arranged inside the high-pressure shaft 10B.

Both shafts 10A, 10B respectively have a drive side 100 and an output side 101. The drive sides 100 are driven by the respectively associated turbine stages 260, 261. The output sides 101 are driven by the respective drive side 100 and drive the fan 240 or the compressor 241.

Unexpected influences, in particular excessive forces between the drive side 100 and the output side 101 of one of the shafts 10A, 10B, can lead to torsion and/or torsional vibrations of one or both of the shafts 10A, 10B, or can even cause them to break.

The turbomachine 2 comprises at least one arrangement 1 (1.1 to 1.4) for detecting a shaft break so as to be able to take countermeasures following a shaft break to one of the shafts 10A, 10B or to multiple shafts 10A, 10B of the turbomachine 2. The arrangement 1 is explained in more detail based on the following figures.

Figure 2:
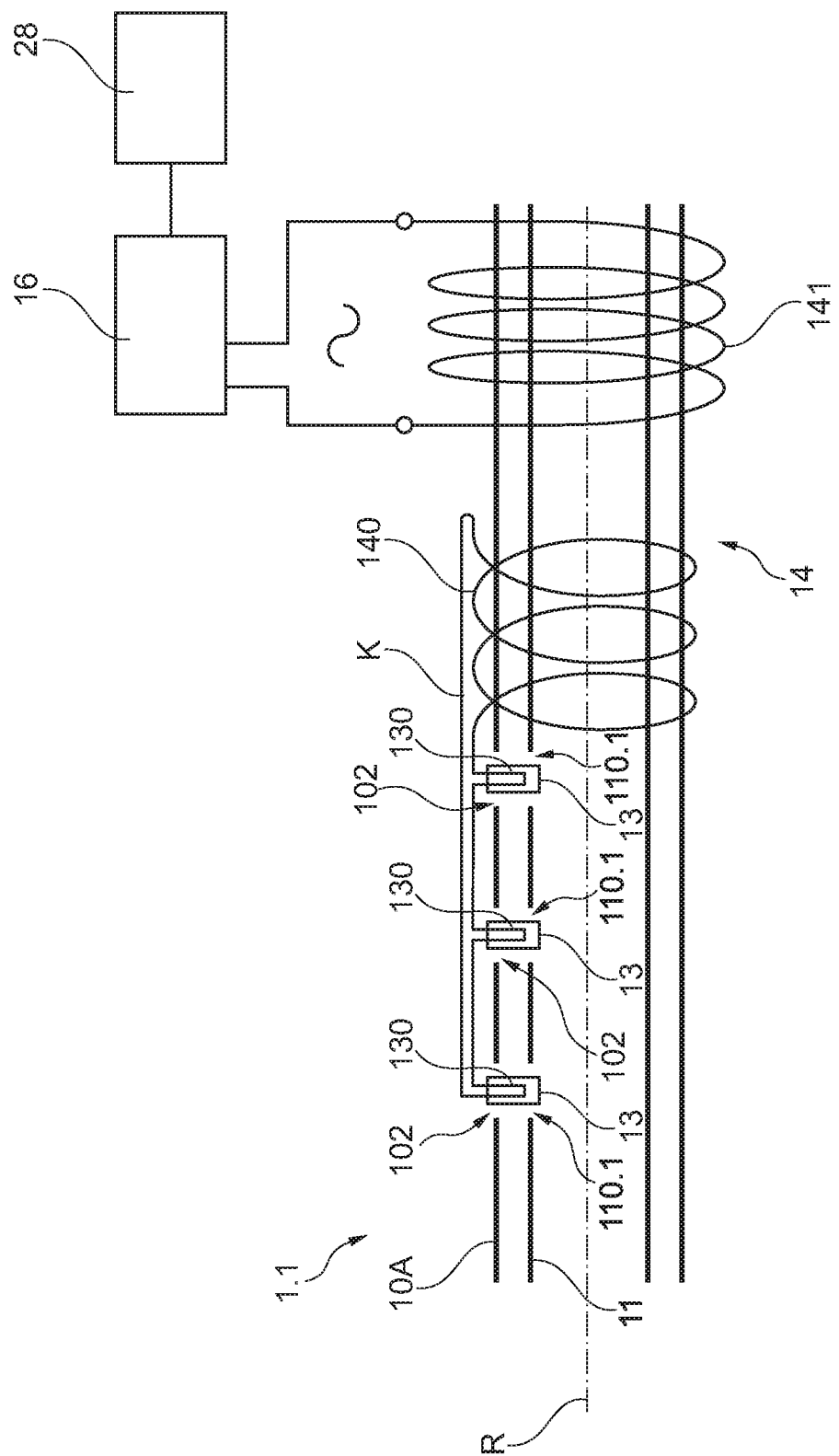
FIG. 2 shows a schematic rendering of an arrangement for detecting a shaft break with three breakage elements arranged next to each other along a rotational axis of a shaft and a non-contact signal transmission element in the form of a coil.

FIG. 2 shows the arrangement 1.1 for detecting a shaft break, in the present case based on the example of a low-pressure shaft 10A, wherein the following explanations correspondingly also apply to the high-pressure shaft 10B, or in general to any one or multiple shafts 10A, 10B of the turbomachine 2.

The low-pressure shaft 10A is mounted at a bearing 12A so as to be rotatable about the rotational axis R with respect to a structural component that is fixedly attached to the engine. In the present case, the bearing 12A is embodied as a fan bearing, wherein other arrangements are also possible. As illustrated in FIG. 1, the bearing 12A is arranged adjacent to the fan 107. The structural component that is fixedly attached to the engine may for example be firmly connected to the housing 22 of the turbomachine 2 and/or firmly connected or connectable to the aircraft.

FIG. 2 shows the arrangement 1.1 in a cross-section along the rotational axis R of the low-pressure shaft 10A and the reference shaft 11, which is also shown in FIG. 1. The low-pressure shaft 10A is configured as a hollow shaft. The reference shaft 11 is arranged inside the low-pressure shaft 10A coaxially to the same.

Multiple openings 102 are formed in the low-pressure shaft 10A (more precisely, in a wall of the low-pressure shaft 10A), in the present case three openings 102. The openings 102 are arranged in a manner offset with respect to one another along the rotational axis R.

Likewise, multiple openings 110.1 are formed in the reference shaft 11, in the present case also three openings 110.1. The openings 110.1 in the reference shaft 11 are arranged so as to be (at least partially) overlapping with the openings 102 in the low-pressure shaft 10A, so that multiple (here three) pairs of (at least partially) overlapping openings 102, 110.1 are formed. Respectively one breakage element 13 extends through each pair of openings 102, 110.1 that are overlapping with each other.

Each of the breakage elements 13 comprises a ceramic material body in which a signal conductor 130 is embedded. The ceramic material body preferably consist of a heat-resistant ceramic material. The signal conductors 130 of the breakage elements 13 are connected in series to each other by means of electrical connections. Each of the signal conductors 130 is configured in the form of a loop that extends through both openings 102, 110.1 which are arranged in a manner superimposed upon each other.

The arrangement 1.1 further comprises a non-contact signal transmission element in the form of a coil 140. With the signal conductors 130, the coil 140 forms a closed electric circuit K. Optionally, the electric circuit K also comprises further structural components, such as for example a resistor connected in series. If an alternating voltage is induced in the coil 140, an alternating current flows through the signal conductor 130. The coil is connected in a torque-proof manner to the low-pressure shaft 10A, for example it can be wound around the low-pressure shaft 10A.

A stationary coil 141 is arranged adjacent to the coil 140, for example the stationary coil 141 can be arranged next to the coil 140 or around the coil 140. The stationary coil 141 can for example be mounted at a structural component that is fixedly attached to the engine.

The stationary coil 141 is connected to an evaluation unit 16. The evaluation unit can apply a signal, in particular in the form of an alternating voltage, to the stationary coil 141. The alternating voltage creates a varying magnetic flux, which in turn induces an alternating voltage in the coil 140 at the low-pressure shaft 10A. The coil 140 corresponds to a secondary winding of a transformer. Due to the alternating voltage induced in the coil 140, a current flows inside the electric circuit K. In this manner, the evaluation unit 16 can apply an (electrical) signal to each of the signal conductors 130.

In the normal operational state of the low-pressure shaft 10A, the reference shaft 11 rotates together with the low-pressure shaft 10A. In the event of a breakage of the low-pressure shaft 10A, a rotation of the low-pressure shaft 10A or of the broken part of the low-pressure shaft 10A with the openings 102 occurs relative to the reference shaft 11. For this purpose, the reference shaft 11 may for example be connected in a torque-proof manner only to the drive side 100 of the low-pressure shaft 10A, and the openings 102, 110.1 are arranged adjacent to the output side 101 of the low-pressure shaft 10A arranged, or vice versa.

A relative movement between the low-pressure shaft 10A (or a part of the same) and the reference shaft 11 brings the openings 102, 110.1, which previously had been arranged so as to be at least partially or at least mostly overlapping, out of alignment with each other at least partially. In other words, the overlap of the openings 102, 110.1 is reduced. In this manner, the breakage elements 13 are sheared off and/or broken. This results in the signal conductor 130, which is embedded in the breakage element 13, being severed.

Cutting off a signal conductor 130 results in the electric circuit K being interrupted. At the evaluation unit 16, this shows in an altered voltage and/or an altered current at the stationary coil 141, in particular in a spiking voltage. In this manner, the evaluation unit 16 can detect whether or not the signal conductors 130 are severed by applying the signal to the signal conductors 130. Together, the coils 140, 141 from an inductive coupling appliance in the form of a pair of coils 14.

If the evaluation unit 16 detects that at least one of the signal conductors 130 has been severed, it can for example output an alarm signal and/or instruct a fuel supply control 28 of the turbomachine 2 to interrupt a fuel supply.

Figure 3A:
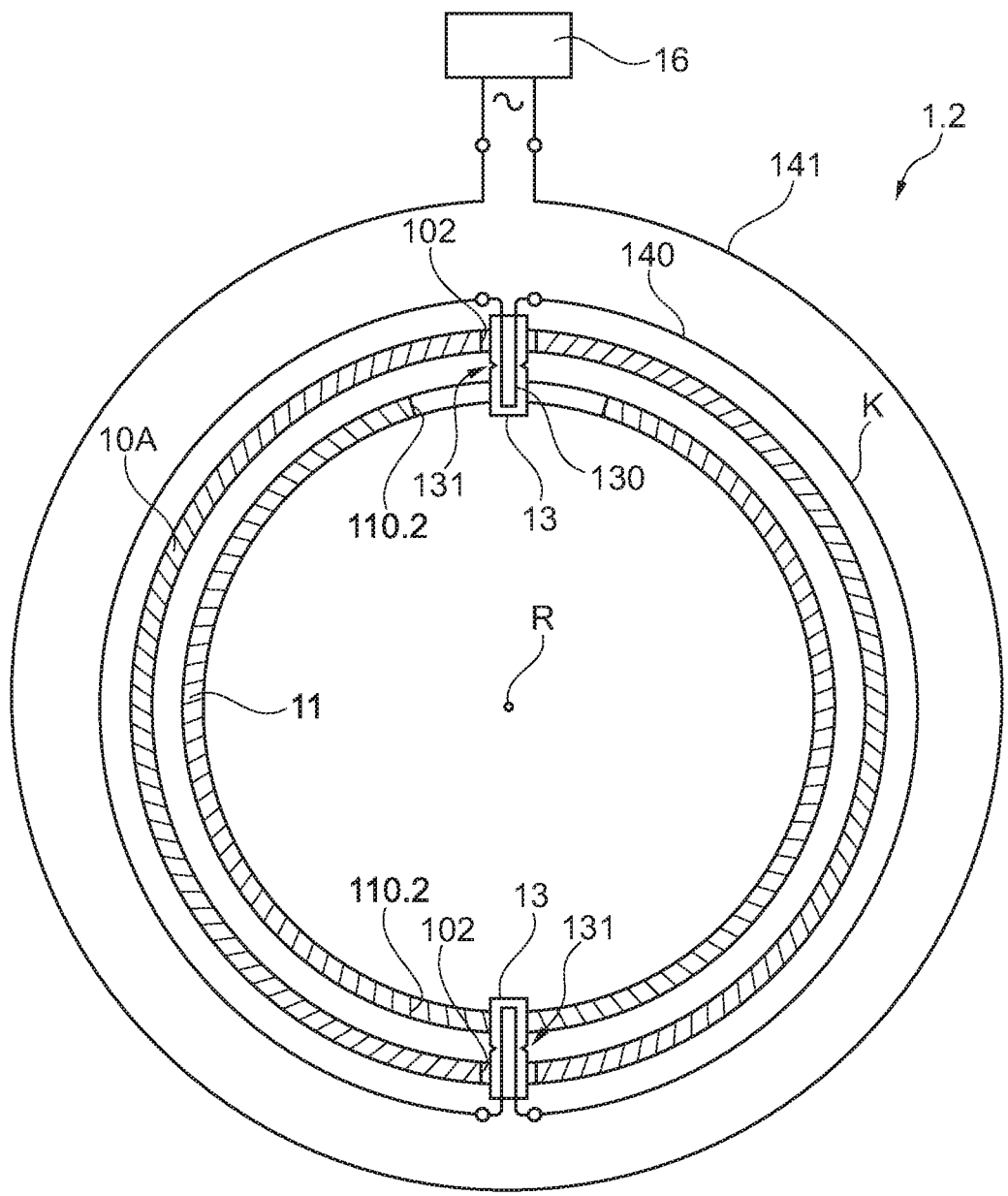
FIG. 3A shows a schematic rendering of an arrangement for detecting a shaft break with two breakage elements arranged on opposite sides of a rotational axis of a shaft and a non-contact signal transmission element in the form of a coil in an operational state according to the intended use of the shaft.

FIG. 3A shows a further arrangement 1.2 for detecting a shaft break, here in a cross-section through the rotational axis R.

Here, the low-pressure shaft 10A comprises two openings 102. In the present case, the two openings 102 are arranged on opposing sides of the rotational axis R (or generally are arranged in a manner displaced with respect to one another about the rotational axis R). Openings 110.2 formed in the reference shaft 11 overlap with the openings 102 of the low-pressure shaft 10A and are arranged coaxially inside the low-pressure shaft 10A, as in the arrangement according to FIG. 2.

According to FIG. 3A, the openings 110.2 of the reference shaft 11 are formed with a larger diameter (in the circumferential direction) than the openings 102 of the low-pressure shaft 10A, which facilitates compensation, e.g. in the case of distortions of the low-pressure shaft 10A in a nominal rotational angle. Alternatively, the openings 102 of the low-pressure shaft 10A are formed with a larger diameter (or opening angle) than the openings 110.2 of the reference shaft. In general, a clearance is present between each of the breakage elements 13 and the edges of at least one of the openings 110.2, 102. In this manner, it is avoided that a torsion of the reference shaft 11 and the low-pressure shaft 10A with respect to each other will lead to a release.

A breakage element 13 is respectively inserted through a pair of overlapping openings 102, 110.2. The signal conductors 130 of the breakage elements 13 are electrically connected in series with each other into an electric circuit K, forming the coil. The coil 140 is externally surrounded by the stationary coil 141. Both coils 140, 141 can have one or multiple windings. The stationary coil 141 is connected to the evaluation unit 16, as has been explained in connection to FIG. 2.

The breakage elements 13 respectively comprise a predetermined breaking point 131 in the form of an incision or a circumferential notch. In this manner, the breakage elements 13 break in a predetermined manner in the event of loading through the edges of the openings 102, 110.2.

Figure 3B:
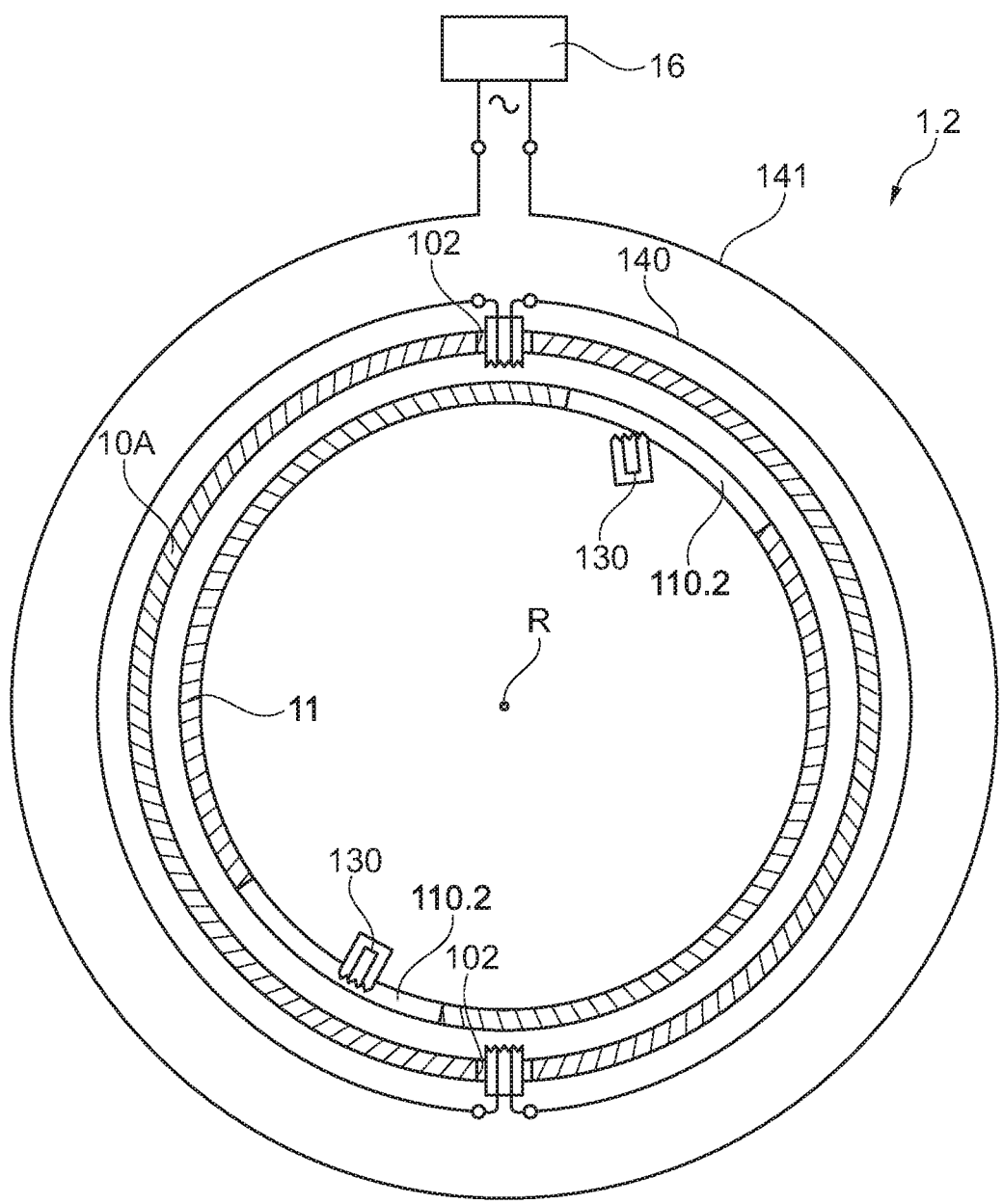
FIG. 3B shows the arrangement according to FIG. 3A following a shaft break of the shaft.

FIG. 3B shows the situation following a shaft break of the low-pressure shaft 10A. The low-pressure shaft 10A has been rotated so far relative to the reference shaft 11 that the openings 102, 110.2, which had previously been superimposed upon each other, do no longer overlap (or that at least an overlap surface of the openings 102, 110.2 is significantly reduced). In this manner, the breakage elements 13 are broken at their predetermined breaking points 131. As a result of the breakage elements 13 breaking at the predetermined breaking points 131, the signal conductors 130 have been severed.

Figure 4:
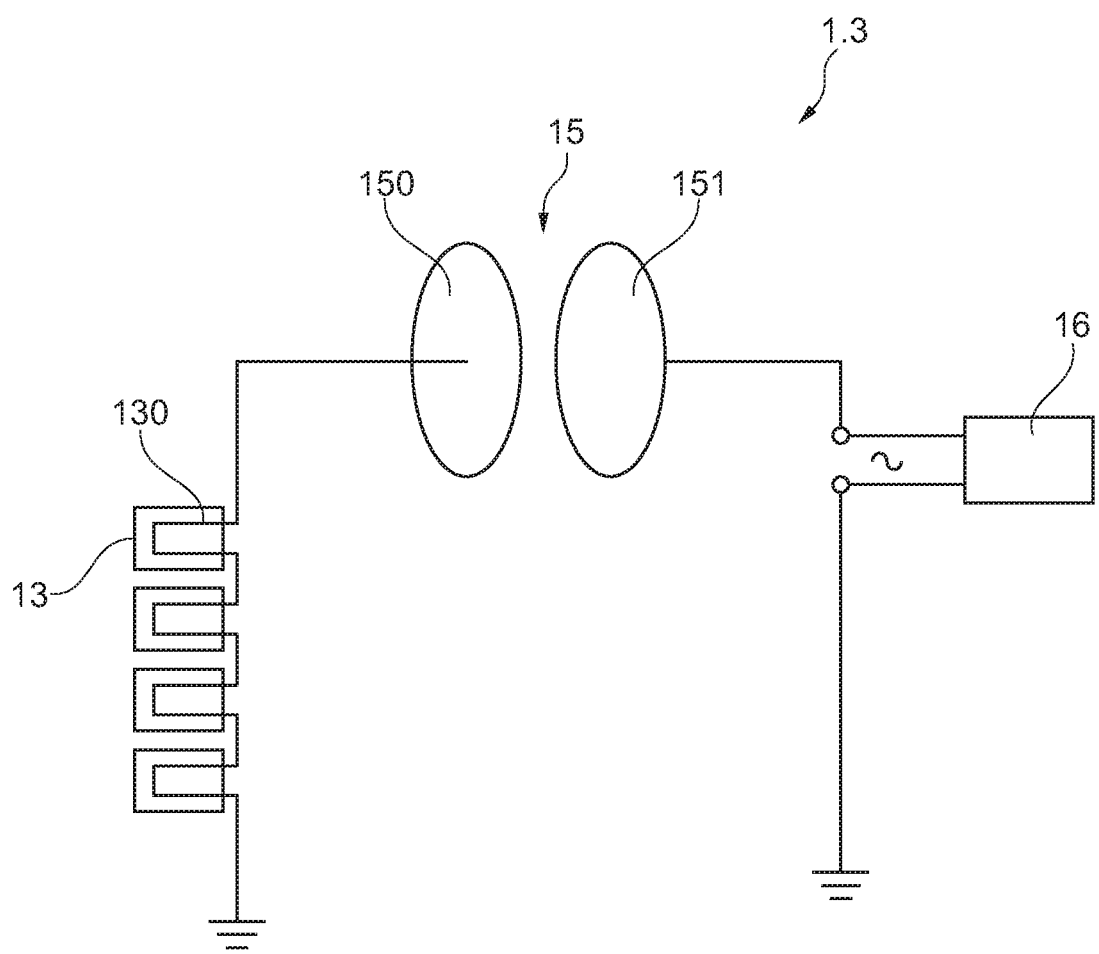
FIG. 4 shows a schematic rendering of an arrangement for detecting a shaft break with multiple breakage elements and a non-contact signal transmission element in the form of an electrode of a capacitor.

FIG. 4 schematically shows some components of a further arrangement 1.3 for detecting a shaft break. It comprises multiple, in the present case four, breakage elements 13 that are arranged along the rotational axis R and/or are arranged at a distance to each other about the rotational axis R in overlapping openings of the low-pressure shaft 10A and the reference shaft 11 (not shown in FIG. 4).

In contrast to an inductive signal transmission, in the arrangement 1.3 according to FIG. 4 a capacitive signal transmission is provided. For this purpose, the signal conductors 130 are connected in series. One end of the conduit of the series connection is placed on a mass of the arrangement 1.3 or of the turbomachine 2. The other end of the conduit of the series connection is connected to a flat electrode 150. The electrode 150 is arranged adjacent to a further flat stationary electrode 151. The stationary electrode 151 is attached at a structural component that is fixedly attached to the engine. The electrode 150 is attached to the low-pressure shaft 150. The stationary electrode 151 is connected to a contact of the evaluation unit 16, which is also placed on the mass with a further contact. The evaluation unit 16 applies an alternating voltage to its contacts. Together, the two electrodes 150, 151 form a capacitor 15 with a capacitance. The arrangement 1.3 comprises an oscillation circuit, wherein the signal conductors 130 form a part of the oscillation circuit. If at least one of the signal conductors 130 is severed as a result of a shaft break of the low-pressure shaft 10A, the electrode 150 does no longer rest on the mass, which is detected by the evaluation unit 16, for example based on an altered alternating current resistance and/or an altered resonant frequency of the circuit. In this manner, the evaluation unit 16 can infer that a shaft break of the low-pressure shaft 10A is present. Alternatively or additionally, the evaluation unit 16 can measure a time constant for one or multiple charging and/or discharging procedures of the capacitor 15. By means of a charging voltage, the evaluation unit 16 applies an electrical signal to the signal conductors 130. If the evaluation unit 16 detects a change in the time constant (e.g. between two consecutive measurements) and/or a detuning of the oscillation circuit, it can infer based on this that at least one of the signal conductors 130 has been severed, and can thus infer that a shaft break is present.

Figure 5:
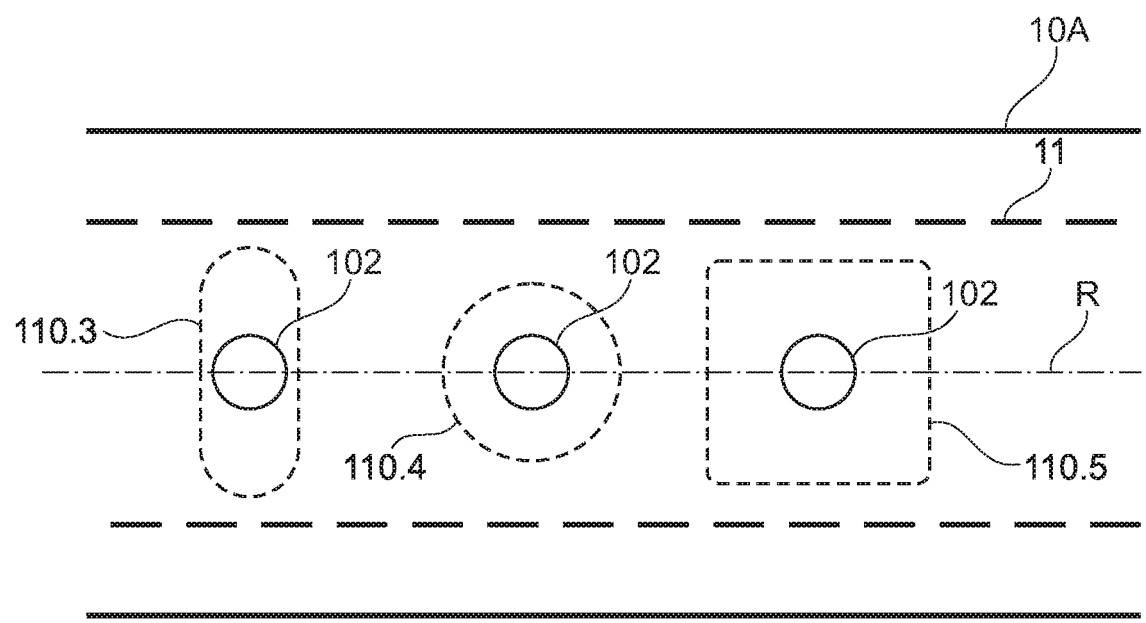
FIG. 5 shows a schematic rendering of multiple different possible embodiments of openings in the shaft and the reference shaft in the arrangements according to FIG. 2 to 4.

FIG. 5 shows, in a top view onto the low-pressure shaft 10A, possible embodiments of openings 110.3, 110.4, 110.5 in the reference shaft 11. In all three of the shown cases, the opening 110.3, 110.4, 110.5 in the reference shaft 11 is larger than the respectively associated opening 102 in the low-pressure shaft 10A, thus facilitating a compensation for the nominal torsion of the low-pressure shaft 10A as it may occur during operation of the turbomachine 2 according to the intended use.

The opening 110.3 of the reference shaft 11 that is shown on the left side of FIG. 5 is formed in a slit-shaped manner. In the present case, this opening 110.3 is elongated, having a greater length than width. With its length, the opening 110.3 extends along the circumference of the reference shaft 11 about the rotational axis R, with its width it extends along the rotational axis R. This opening 110.3 allows for a twisting or warping of the low-pressure shaft 10A with respect to the reference shaft 11 about the rotational axis R within a predetermined tolerance range (e.g. of +/−5 degrees) before it gets out of alignment with the associated opening 102 in the low-pressure shaft 10A.

The opening 110.4 of the reference shaft 11 shown in the middle of FIG. 5 is formed in a circular manner and with a larger diameter than the likewise circular opening 102 of the low-pressure shaft 10A.

The opening 110.5 of the reference shaft 11 that is shown on the right side of FIG. 5 is formed in a substantially rectangular manner with a greater length and width than the circular opening 102 of the low-pressure shaft 10A.

The two last-mentioned openings 110.4, 110.5 allow for relative displacements of the low-pressure shaft 10A with respect to the reference shaft 11 along the rotational axis R, as well as for twisting or warping of the low-pressure shaft 10A with respect to the reference shaft 11 about the rotational axis R within a predetermined tolerance range.

Figure 6:
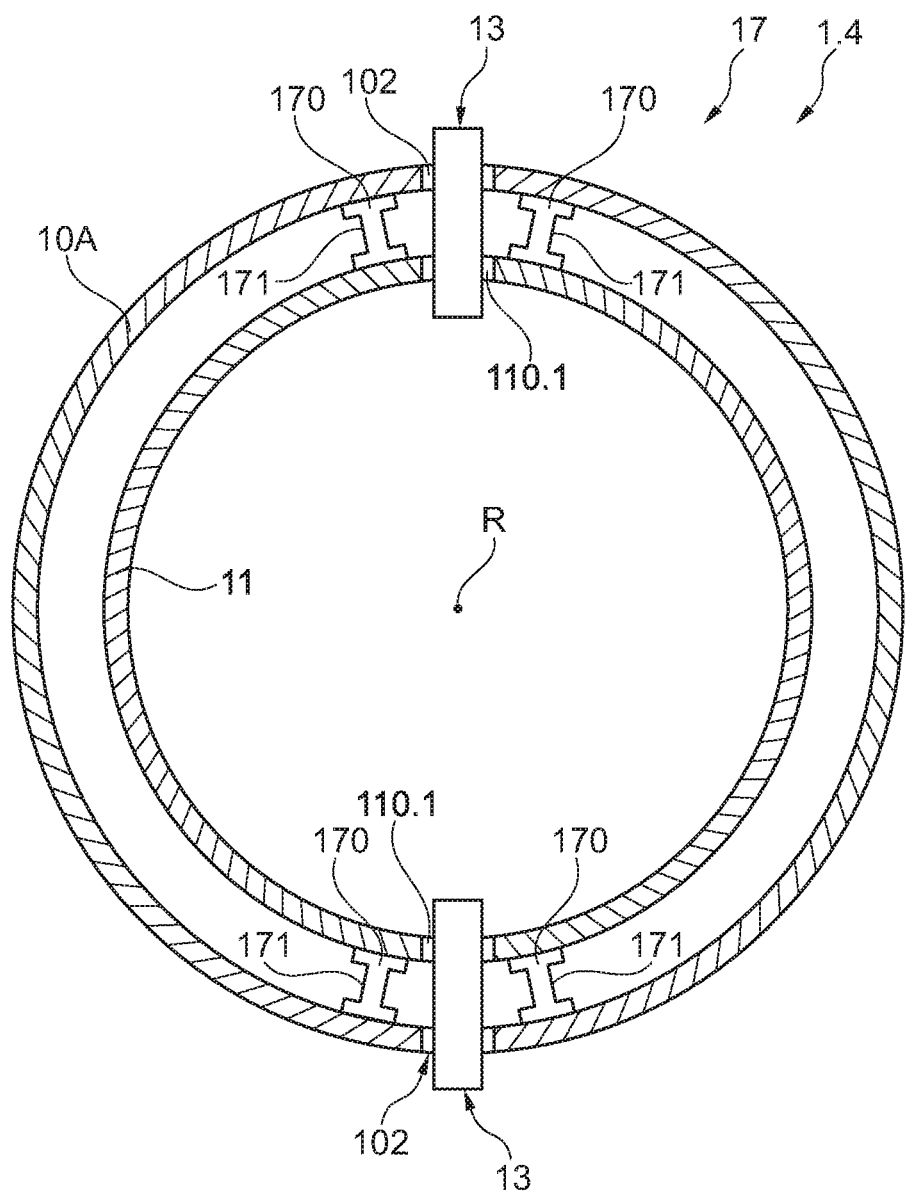
FIG. 6 shows a schematic rendering of an arrangement for detecting a shaft break with a breakage protection with multiple breakage protection elements that breaks at a defined torque.

FIG. 6 shows a further arrangement 1.4 for detecting a shaft break in a cross-section through the rotational axis R. In the following, only the differences to the arrangement 1.2 according to FIG. 3A, 3B are described, and otherwise it is referred to the above explanations.

The arrangement 1.4 comprises a breakage protection 17. By means of the breakage protection 17, the low-pressure shaft 10A and the reference shaft 11 are connected to each other in a torque-proof manner. The breakage protection 17 is configured in such a manner that it breaks when a predefined maximum force is exceeded. For this purpose, the breakage protection 17 comprises multiple breakage protection elements 170. Each breakage protection element 170 is firmly connected to the low-pressure shaft 10A and the reference shaft 11. The breakage protection elements 170 prevent a relative movement between the low-pressure shaft 10A and the reference shaft 11. The breakage protection elements 170 are configured to break starting at a maximum force.

When the breakage protection elements 170 break, a relative movement between the low-pressure shaft 10A and the reference shaft 11 is unblocked. This relative movement can then bring the openings 102, 110.1 in the low-pressure shaft 10A and the reference shaft 11 out of alignment with each other, so that the breakage elements 13 that are respectively received inside a pair of openings 102, 110.1 break, and in doing so cause the respective signal conductors 130 (not shown in FIG. 6) to be severed.

According to FIG. 6, the openings 102 in the low-pressure shaft 10A have substantially the same size as the openings 110.1 in the reference shaft 11. The openings 102 in the low-pressure shaft 10A are aligned with the openings 110.1 in the reference shaft 11.

For a controlled breakage to occur, the breakage protection elements 170 comprise predetermined breaking points 171, in the present case respectively in the form of a circumferential groove. Alternatively or additionally, the breakage protection elements 170 can be made of a brittle material.

According to FIG. 6, breakage protection elements 170 are respectively arranged on opposite sides of a pair of overlapping openings 102, 110.1 in the low-pressure shaft 10A and the reference shaft 11.

Alternatively, only one breakage protection element 170 is provided per pair of overlapping openings 102, 110.1. Optionally, it can enclose the openings 102, 110.1, for example to seal the openings 102, 110.1 against the intermediate space between the low-pressure shaft 110.1 and the reference shaft 11.

Figure 7:
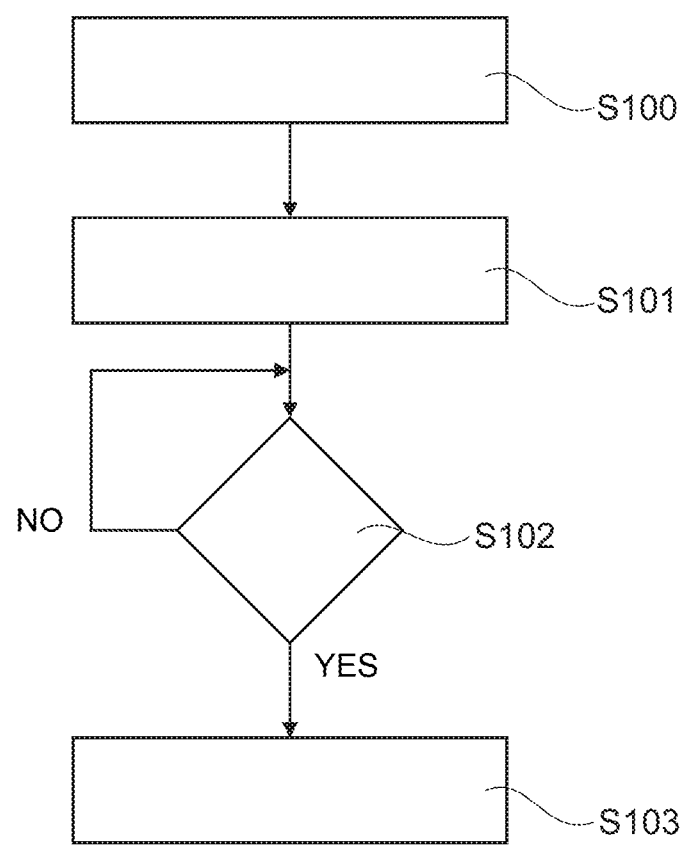
FIG. 7 shows a method for detecting a shaft break of a shaft.

FIG. 7 shows a method for detecting a shaft break of a shaft 10A. The method comprises the following steps:

In step S100, a shaft 10A is provided.

In step S101, a reference shaft 11 that can be rotated together with the shaft 10A is provided. The reference shaft 11 comprises at least one opening 110.1-110.5, wherein the opening 110.1-110.5 of the reference shaft 11 overlaps with an opening 102 in the shaft 10A in an operational state of the shaft according to the intended use 10A. Extending through both overlapping openings is a signal conductor 130 that can be severed.

In step S102, it is checked whether the signal conductor is severed or not to detect a severing of the signal conductor 130. This is carried out by applying a signal to the signal conductor 130. If no severing of the signal conductor is detected, the method performs step S102 again.

If a severing of the signal conductor is detected, it is determined that a shaft break of the shaft 10A has occurred, and it is proceeded to step S103, for example.

In step S103, suitable measures are taken to minimize the consequences of the shaft break. For example, a fuel supply is severed, or variable guide vanes are adjusted. In this way, it is possible to detect a shaft break of the shaft and to quickly initiate respective measures in a simple manner and without mechanically movable parts.

For performing the method, any arrangement 1 for detecting a shaft break described herein can be used.

PARTS LIST 1.1 to 1.4 arrangement
10A shaft (low-pressure shaft)
10B shaft (high-pressure shaft)
100 drive side
101 output side
102 opening
11 reference shaft
110.1 to 110.5 opening
12A, 12B bearing
13 breakage element
130 signal conductor
131 predetermined breaking point
14 pair of coils (inductive coupling appliance)
140 coil (non-contact signal transmission element)
141 stationary coil
15 capacitor (capacitive coupling appliance)
150 electrode (non-contact signal transmission element)
151 stationary electrode
16 evaluation unit
17 breakage protection
170 breakage protection element
171 predetermined breaking point
2 turbomachine
22 housing
23 air intake
240 fan
241 compressor
25 combustion chamber
26 turbine
260 low-pressure turbine
261 high-pressure turbine
27 nozzle
28 fuel supply control
K electric circuit
R rotational axis

The invention claimed is:

1. An arrangement for detecting a shaft break, comprising:
a shaft including an opening,
a reference shaft that is rotatable together with the shaft, the reference shaft including a further opening, wherein, in an intended operational state of the shaft, the opening in the shaft overlaps with the further opening in the reference shaft, a signal conductor that is severable extending through the opening and further opening, an evaluation unit operatively connected to the signal conductor and is configured for detecting a severing of the signal conductor by applying a signal to the signal conductor to detect a shaft break of the shaft.

2. The arrangement according to claim 1, wherein the opening and further opening, which overlap in the intended operational state, overlap with each other less or not at all in an overloaded operational state.

3. The arrangement according to claim 1, wherein the signal conductor is embedded in a breakage element made of brittle material.

4. The arrangement according to claim 3, wherein the brittle material is a ceramic material.

5. The arrangement according to claim 3, wherein the breakage element has a predetermined breaking point.

6. The arrangement according to claim 1, wherein the signal conductor is an electrical conductor.

7. The arrangement according to claim 1, wherein the signal conductor is operatively connected to the evaluation unit by at least one chosen from an inductive coupling and a capacitive coupling.

8. The arrangement according to claim 1, wherein the signal conductor is operatively electrically connected with a non-contact signal transmission element.

9. The arrangement according to claim 8, wherein the non-contact signal transmission element is configured as a coil extending in a circumferential direction about the shaft at least in certain sections.

10. The arrangement according to claim 9, and further comprising a capacitor with two electrodes, wherein one of the electrodes is attached to the shaft as the non-contact signal transmission element and can be rotated during rotation of the shaft with respect to the other one of the two electrodes.

11. The arrangement according to claim 1, wherein at least one chosen from the opening in the shaft and the further opening in the reference shaft is formed as a slit.

12. The arrangement according to claim 1, wherein the further opening of the reference shaft is larger than the opening in the shaft.

13. The arrangement according to claim 1, and further comprising multiple ones of the signal conductor that are severable and are operatively connected to the evaluation unit, and multiple pairs of overlapping openings and further openings, wherein respectively one of the multiple ones of the signal conductor extends through one of the multiple pairs a pair of overlapping openings and further openings.

14. The arrangement according to claim 13, wherein the multiple one of the signal conductors are connected to each other in series.

15. The arrangement according to claim 1, wherein the shaft and the reference shaft are connected to each other in a fixed relative manner via a breakage protection, wherein the breakage protection breaks when a predefined maximum force is exceeded.

16. The arrangement according to claim 1, wherein the shaft and the reference shaft are arranged coaxially with respect to each other with the reference shaft is arranged inside the shaft.

17. The arrangement according to claim 1, wherein the opening in the shaft is arranged at a lateral surface of the shaft and the further opening in the reference shaft is arranged at a lateral surface of the reference shaft.

18. An aircraft engine, having the arrangement according to claim 1.

19. A method for detecting a shaft break of a shaft, with the following steps:
providing a shaft;
providing a reference shaft with an opening that can be rotated together with the shaft, wherein the opening of the reference shaft overlaps with an opening in the shaft in an intended operational state of the shaft, providing a signal conductor that is severable and extends through the two openings; and determining whether or not the signal conductor is severed by applying a signal to the signal conductor to detect a shaft break of the shaft.

* * * * *